United States Patent
Van De Vegte et al.

(10) Patent No.: US 9,974,235 B2
(45) Date of Patent: May 22, 2018

(54) MUSHROOM HARVESTER

(71) Applicant: Vineland Research and Innovations Centre Inc., Vineland Station (CA)

(72) Inventors: John Van De Vegte, Cambridge (CA); John Renfrew, Dundas (CA); Matthew Jandrisits, Oakville (CA); Robert Lau, Stouffville (CA)

(*) Notice: Subject to any disclaimer, the term of this patent is extended or adjusted under 35 U.S.C. 154(b) by 0 days. days.

(21) Appl. No.: 15/505,545

(22) PCT Filed: Aug. 20, 2015

(86) PCT No.: PCT/CA2015/050790
§ 371 (c)(1),
(2) Date: Feb. 21, 2017

(87) PCT Pub. No.: WO2016/029299
PCT Pub. Date: Mar. 3, 2016

(65) Prior Publication Data
US 2017/0265392 A1 Sep. 21, 2017

Related U.S. Application Data

(60) Provisional application No. 62/041,707, filed on Aug. 26, 2014.

(51) Int. Cl.
*G06F 7/00* (2006.01)
*A01D 45/00* (2018.01)
(Continued)

(52) U.S. Cl.
CPC .......... *A01D 45/005* (2013.01); *A01G 18/70* (2018.02); *B25J 11/0045* (2013.01);
(Continued)

(58) Field of Classification Search
None
See application file for complete search history.

(56) References Cited

U.S. PATENT DOCUMENTS

| 4,975,016 A | 12/1990 | Pellenc et al. |
| 5,058,368 A | 10/1991 | Wheeler |

(Continued)

FOREIGN PATENT DOCUMENTS

| CA | 2041824 A1 | 11/1991 |
| CA | 2028731 C | 11/2000 |

(Continued)

OTHER PUBLICATIONS

Extended European Search Report on EP 15836069.3 dated Feb. 15, 2018.

(Continued)

*Primary Examiner* — Yolanda R Cumbess
(74) *Attorney, Agent, or Firm* — Brunet & Co. Ltd.; Robert A. H. Brunet; Hans Koenig

(57) ABSTRACT

A device for harvesting mushrooms from a mushroom bed involves a robotic arm configured to interchangeably deploy one of a plurality of different suction grippers, each of the suction grippers having a suction cup having a size and shape profile appropriate for gripping a cap of a mushroom, the cap having a size and shape profile within a predetermined range. A vacuum source in fluid communication with the suction gripper supplies negative air pressure to the suction gripper for retaining a cap of the mushroom to be harvested in the suction cup. A control circuit in electronic communication with the suction gripper and the vacuum source is configured to automatically adjust the negative air pressure in the suction gripper in response to harvesting requirements during a mushroom harvesting process. A few standard mushroom shapes have been identified, which permits suction cup designs that maximize contact between the suction cups and the mushroom caps, which permits minimizing the strength of the vacuum needed to harvest the mushrooms.

20 Claims, 5 Drawing Sheets

(51) Int. Cl.
B25J 15/00 (2006.01)
B25J 15/06 (2006.01)
B25J 11/00 (2006.01)
B25J 15/04 (2006.01)
B25J 19/00 (2006.01)

(52) U.S. Cl.
CPC ....... *B25J 15/0057* (2013.01); *B25J 15/0441* (2013.01); *B25J 15/0675* (2013.01); *B25J 15/0683* (2013.01); *B25J 19/0058* (2013.01); *B25J 15/06* (2013.01)

(56) References Cited

U.S. PATENT DOCUMENTS

| | | | |
|---|---|---|---|
| 5,185,989 A | 2/1993 | Russell et al. | |
| 5,471,827 A | 12/1995 | Janssen et al. | |
| 8,033,087 B2* | 10/2011 | Rapila | A01G 18/70 56/327.1 |
| 2009/0188771 A1 | 7/2009 | Van Den Top | |
| 2009/0320430 A1* | 12/2009 | Rapila | A01G 18/70 56/121.4 |
| 2011/0022231 A1* | 1/2011 | Walker | A01D 46/264 700/259 |

FOREIGN PATENT DOCUMENTS

| | | |
|---|---|---|
| CA | 2609122 C | 7/2014 |
| JP | 2003/209394 A | 7/2003 |
| NL | 86/00887 A | 11/1987 |
| WO | 91/11902 | 8/1991 |
| WO | 2008/037035 A1 | 4/2008 |

OTHER PUBLICATIONS

International Search Report and Written Opinion on PCT/CA2015/050790 dated Nov. 4, 2015.

* cited by examiner

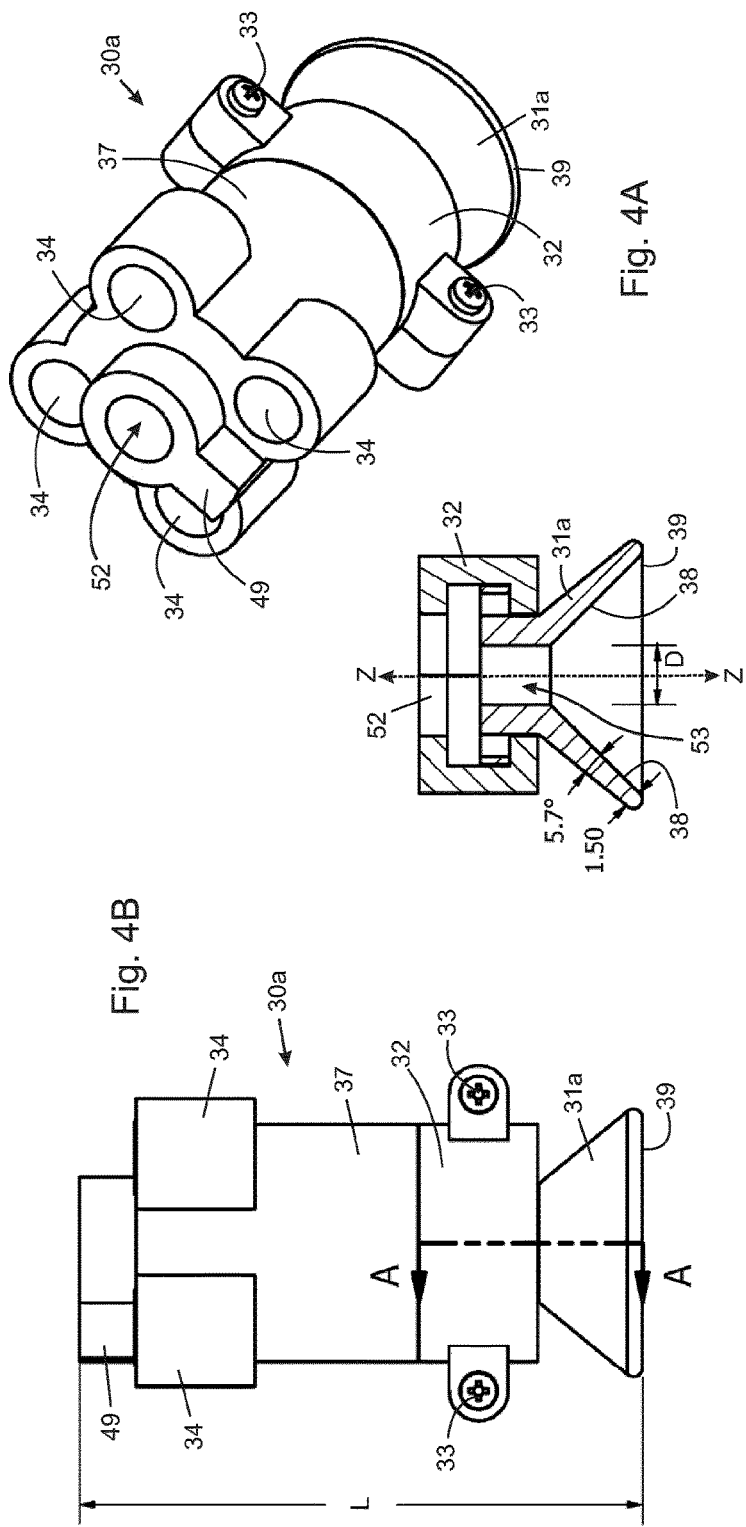

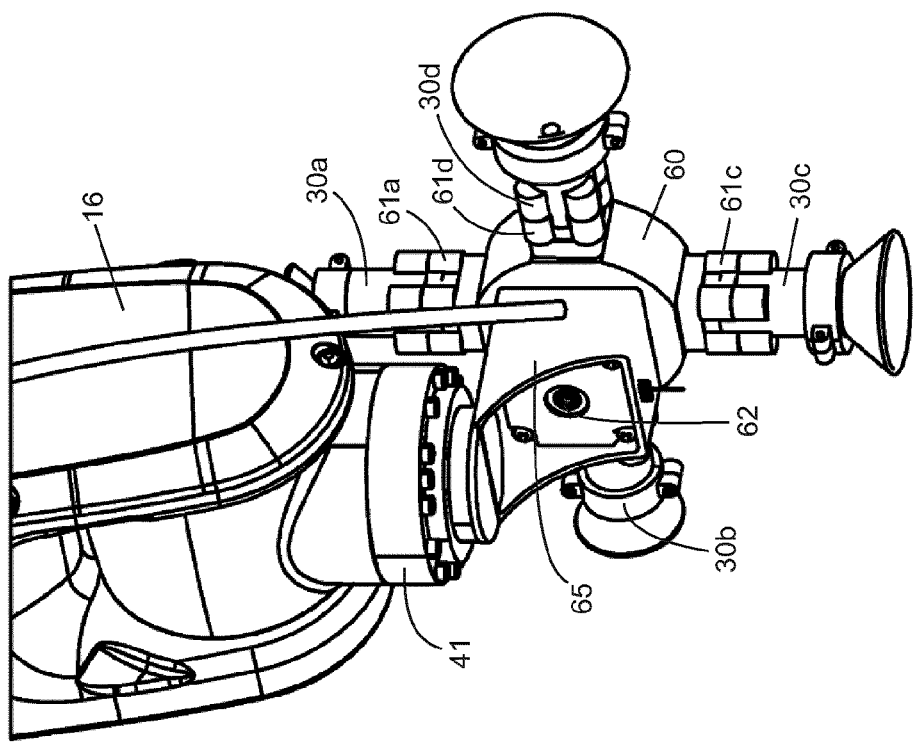
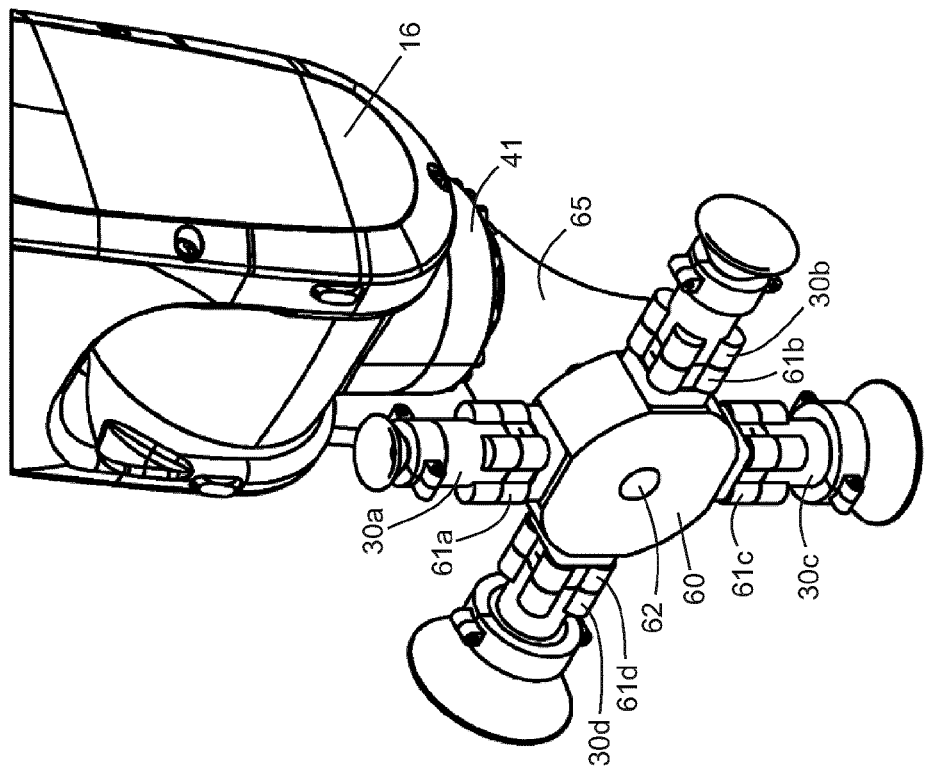

MUSHROOM HARVESTER

CROSS-REFERENCE TO RELATED APPLICATIONS

This application is a national phase entry of International Application PCT/CA2015/050790 filed Aug. 20, 2015 and claims the benefit of U.S. Provisional Patent Application Ser. No. 62/041,707 filed Aug. 26, 2014, the entire contents of both of which are herein incorporated by reference.

FIELD

This application relates to agriculture, particularly to devices and methods for harvesting mushrooms from a mushroom bed.

BACKGROUND

Graze harvesting of mushrooms involves strategic harvesting of mushrooms from a bed of mushrooms in order to maximize crop yield. Currently, graze harvesting of mushrooms is conducted manually at mushroom farms. Differences in operator training and experience result in variation in harvest results and reduces crop yield. The automated harvesting of mushrooms would provide significant cost reduction to mushroom growers. An important aspect of automating mushroom harvesting is the availability of a gripper that is able to grip the mushroom, remove it from compost, retain it through a stem trim operation and finally deposit it in a packaging tray. The gripper should not cause any immediate or latent damage to the mushroom. In addition, the gripper should be small enough that it does not damage any mushrooms adjacent to the mushroom being harvested. Finally, during graze harvesting for the fresh mushroom market, mushrooms ranging in size from about 15-70 mm cap diameter are harvested. Therefore the gripper should be able to grip a wide range of mushroom sizes.

There have been a few attempts to develop automated mushroom harvesting systems and devices. For example, U.S. Pat. No. 5,058,368 issued Oct. 22, 1991 describes a device for harvesting mushrooms using a suction gripper comprising a bellows-style suction gripper with an internal, porous foam block which is intended to support the mushroom cap. However, the porous foam would quickly fill with mushroom bed compost thereby disrupting the vacuum flow required to pick up the mushrooms. U.S. Pat. No. 5,471,827 issued Dec. 5, 1995 describes a device for harvesting mushrooms using a suction gripper described as a long suction bellows. However, this gripper design would not provide sufficient angular and axial rigidity to make the necessary shifting and rotating movements required to remove a mushroom from a bed. U.S. Pat. No. 8,033,087 issued Oct. 11, 2011 describes the use of commercially available suction pads for gripping mushrooms. However, through testing of a variety of commercially available suction grippers, we have found that they do not work well for harvesting mushrooms, either causing damage to the mushroom caps or being unable to support a reasonable range of cap diameters.

There remains a need for devices and methods for automated harvesting of mushrooms from a mushroom bed, which reduce damage to mushroom caps and/or are able to support a commercially useful range of mushroom cap diameters.

SUMMARY

In one aspect, there is provided a device for harvesting mushrooms from a mushroom bed, comprising: a robotic arm configured to interchangeably deploy one of a plurality of different suction grippers, each of the suction grippers comprising a suction cup having a size and shape profile appropriate for gripping a cap of a mushroom, the cap having a size and shape profile within a predetermined range, the robotic arm configured to position the suction gripper over a mushroom to be harvested; a vacuum source in fluid communication with the suction gripper for supplying negative air pressure to the suction gripper for retaining a cap of the mushroom to be harvested in the suction cup; and, a control circuit in electronic communication with the suction gripper and the vacuum source, the control circuit configured to automatically adjust the negative air pressure in the suction gripper in response to harvesting requirements during a mushroom harvesting process.

In another aspect, there is provided a system for harvesting mushrooms from a mushroom bed, comprising: the mushroom harvesting device described herein configured to harvest mushrooms from the bed; one or more cameras for locating mushrooms in the bed; and, a control apparatus operatively linked to the one or more cameras and the mushroom harvesting device, the control apparatus configured to operate the mushroom harvesting device to harvest mushrooms located by the one or more cameras from the bed.

In yet another aspect, there is provided a method of harvesting mushrooms from a mushroom bed, comprising: disposing the mushroom harvesting device described herein over a mushroom in the bed; determining which of the plurality of different suction grippers to use to harvest the mushroom; deploying the determined suction gripper over the mushroom; and, supplying negative air pressure to the suction gripper to retain a cap of the mushroom in the suction cup of the determined suction gripper.

The mushroom harvesting device, system and method permit automated harvesting of mushrooms, including gripping the mushrooms, removing the mushrooms from compost in the mushroom bed, retaining the mushrooms through a stem trim operation and depositing the mushrooms in a packaging tray. Mushroom harvesting may be accomplished while reducing immediate and latent damage to the mushrooms and reducing damage to mushrooms adjacent to the mushroom's being harvested. The device, system and method are particularly suitable for graze harvesting, more particularly for graze harvesting of mushrooms having cap diameters within a specified size range, for example cap diameters in a range of 15-70 mm, especially 20-60 mm. The device comprises a mushroom gripper capable of gripping mushrooms efficiently over a large cap diameter range while reducing damage to the mushrooms being harvested.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which:

FIG. 4A depicts a perspective view of a suction gripper suitable for harvesting mushrooms with a major cap diameter of 20-30 mm.

FIG. 4B depicts a side view of the suction gripper of FIG. 4A.

FIG. 4C depicts a bottom end view of the suction gripper of FIG. 4A.

FIG. 4D depicts a cross-section view through A-A in FIG. 4B.

FIG. 5A depicts a magnified front perspective view of an end-of-arm tooling of a robotic arm having a rotatable carousel rotatably mounted thereon and four different suction grippers mounted on the carousel.

FIG. 5B depicts a rear perspective view of the end-of-arm tooling of the robotic arm depicted in FIG. 5A.

DETAILED DESCRIPTION

Figure 1:
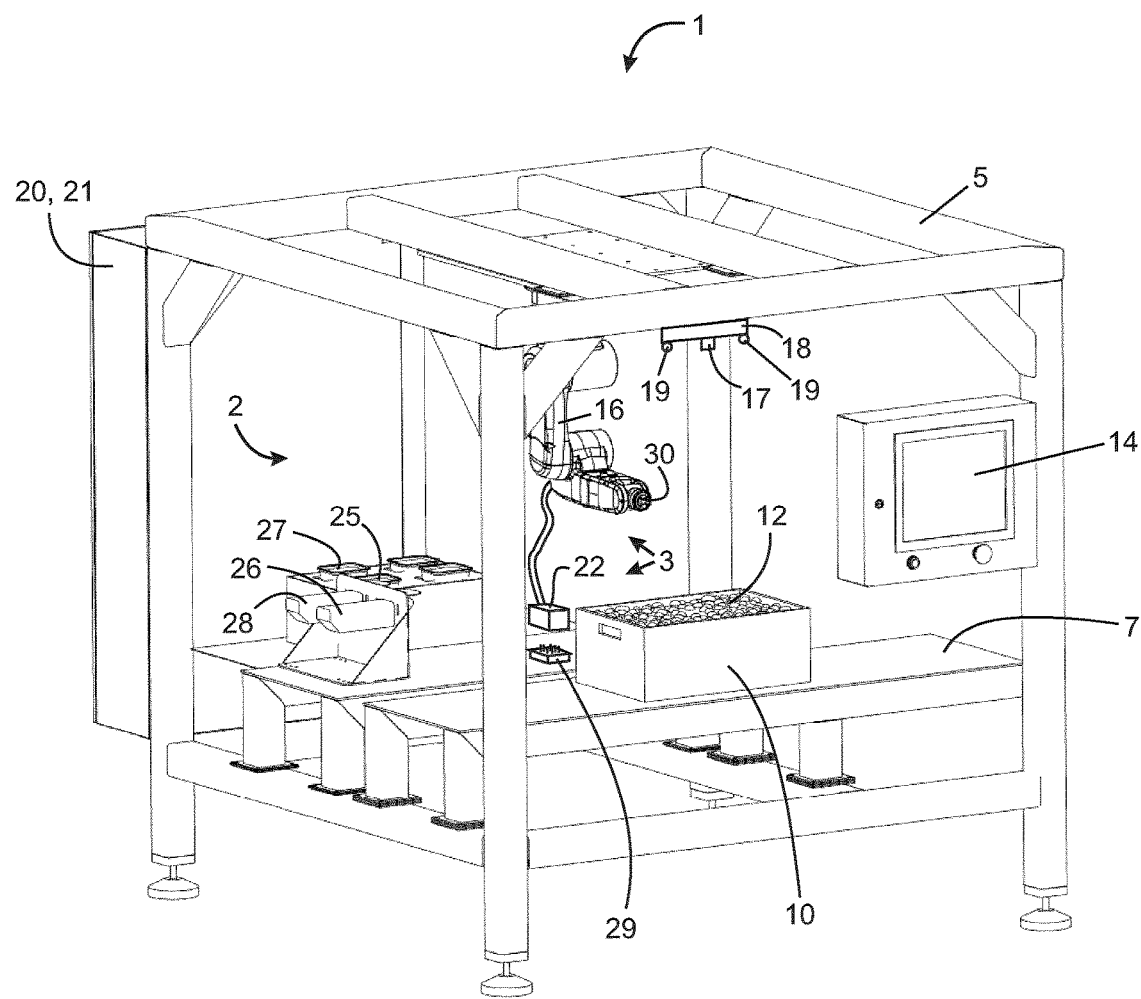
FIG. 1 depicts a schematic diagram of a mushroom harvesting device of the present invention in context of a mushroom harvesting work cell.

The device for harvesting mushrooms comprises a robotic arm configured to interchangeably deploy one of a plurality of different suction grippers. The challenge in developing a suction gripper for harvesting mushrooms was to create a design which reduces or causes no damage to a surface of the mushroom cap. Following testing of a large number of commercially available suction grippers, it became evident that maximizing contact surface area between the mushroom cap and an inner wall of the suction cup of the suction gripper while minimizing the amount of vacuum applied was important for success.

To develop suction cups that maximize contact surface area, size and shape profile data were collected for mushrooms. Each mushroom has a major and a minor cap diameter, the major cap diameter substantially perpendicular to a longitudinal axis of the mushroom stem and the minor cap diameter substantially parallel to the longitudinal axis of the mushroom stem. The major cap diameter and minor cap diameter for mushroom cap cross sections of 100 mushrooms were measured and evaluated. It was found that mushrooms having cap diameters in a range of 15-70 mm can be categorized into three to five, preferably four, size categories based on a ratio of the major cap diameter to the minor cap diameter. Thus, the plurality of different suction grippers for the device preferably comprises 3-5 suction grippers, more preferably 4 suction grippers. Each of the plurality of different suction grippers comprises a suction cup having a size and shape profile appropriate for gripping a cap of a mushroom, the cap having a size and shape profile within a predetermined range.

For mushrooms having major cap diameters in a range of about 20-30 mm, the ratio of major cap diameter to minor cap diameter is generally in a range of about 1.375-1.425, usually close to about 1.4 (e.g. about 1.392).

For mushrooms having major cap diameters in a range of about 30-40 mm, the ratio of major cap diameter to minor cap diameter is generally in a range of about 1.425-1.475, usually close to about 1.45 (e.g. about 1.456).

For mushrooms having major cap diameters in a range of about 40-50 mm, the ratio of major cap diameter to minor cap diameter is generally in a range of about 1.525-1.575, usually close to about 1.5 (e.g. about 1.564).

For mushrooms having major cap diameters in a range of about 50+ mm, the ratio of major cap diameter to minor cap diameter is generally in a range of about 1.475-1.525, usually close to about 1.5 (e.g. about 1.504).

Based on the ratio of major cap diameter to minor cap diameter an optimal shape profile of the inner wall of the suction cup was developed. Further based on the ratio, an outer diameter of the suction cup was chosen as a compromise between maximizing the contact surface area and ensuring that the outer diameter of the suction cup does not extend past an outer edge of the mushroom cap in order to reduce potential damage to adjacent mushrooms during harvesting. As a result, it is preferred that the suction cup of at least one of the suction grippers has a right circular frustoconical inner wall. Preferably, the suction cups of all of the suction grippers have right circular frustoconical inner walls. Preferably, at least one of the suction cups has a base diameter in a range of about 21-24 mm (e.g. about 22-23 mm), about 31-34 mm (e.g. about 32-33 mm), about 41-44 mm (e.g. about 42-43 mm) or about 51-54 mm (e.g. about 52-53 mm). More preferably, the suction cup of a first suction gripper has a base diameter in a range of about 21-24 mm (e.g. about 22-23 mm), the suction cup of a second suction gripper has a base diameter in a range of about 31-34 mm (e.g. about 32-33 mm), the suction cup of a third suction gripper has a base diameter in a range of about 41-44 mm (e.g. about 42-43 mm), and the suction cup of a fourth suction gripper has a base diameter in a range of about 51-54 mm (e.g. about 52-53 mm).

The suction cups preferably comprise a flexible material, for example an elastomeric material. The material is preferably of sufficient flexibility and strength that the suction cup can form an efficient seal with the mushroom cap while maintaining an appropriate robustness to withstand operations over an extended period of time. Durometer of the material depends on the material being used and thickness of the suction cup wall with a view to obtaining the desired flexibility and strength characteristics. The elastomeric material preferably comprises a natural rubber (e.g. polyisoprene), a synthetic rubber (e.g. polybutadiene, polychloroprene (neoprene), polyisobutylene, styrene-butadiene, ethylene-propylene, ethylene-propylene-diene (EPDM), ethylene-acrylate, nitrile (NBR)), a fluoroelastomer (e.g. polyvinylidene fluoride), a silicone polymer (e.g. polydimethylsiloxane, acrylic rubber, thermoplastic polyurethane (TPU), vinyl polymer (e.g. polyvinylchloride (PVC)), and the like. Silicone polymers are particularly preferred. Suction cups may be formed by any suitable process, for example 3-D printing, injection molding and the like.

The robotic arm is configured to interchangeably deploy one of the plurality of different suction grippers in a harvesting process. Any workable arrangement may be used, which permits one suction gripper to be deployed in place of another. In one embodiment, each of the plurality of suction grippers may be releasably mountable on the robotic arm.

The robotic arm may be configured to hold one suction gripper at a time. The robotic arm may be configured to automatically release one of the suction grippers and mount another in response to harvesting requirements during the mushroom harvesting process. In another embodiment, the robotic arm may have mounted thereon a rotatable carousel on which the plurality of suction grippers is mountable. The rotatable carousel may be rotated to deploy the desired suction gripper. The suction grippers may be releasably mounted on the carousel to facilitate replacement, servicing and cleaning and to increase the versatility of the mushroom harvesting device.

The suction grippers may be releasably mountable in any suitable manner, for example with bolts, with a threaded boss on the suction gripper, with magnets (e.g. permanent magnets, electromagnets or a combination thereof), and the like. Preferably, suction grippers are magnetically mountable. Electromagnets may make changing suction grippers easier by simply reversing polarity in the magnets. Permanent magnets may reduce overall size of the suction grippers and obviate the need to run power supply lines. An end-of-arm tooling of the robotic arm may be configured to include a mounting adaptor designed for a particular way in which the suction grippers are to be releasably mounted.

The device for harvesting mushrooms further comprises a vacuum source in fluid communication with the suction gripper for supplying negative air pressure (vacuum) to the suction gripper for retaining a cap of the mushroom to be harvested in the suction cup. The vacuum source may be any suitable device for generating a vacuum, for example a vacuum pump or other type of vacuum generator (e.g. a venturi vacuum generator). In a venture vacuum generator, the level of vacuum generated may be varied by adjusting the pressure of compressed air being supplied.

A control circuit in electronic communication with the suction gripper and the vacuum source is configured to actively and automatically adjust the air pressure in the suction gripper in response to harvesting requirements during harvesting, particularly with a view to minimizing the effect of suction vacuum on the mushroom cap. The air pressure is actively adjusted during harvesting of the mushroom to reduce damage to the cap of the mushroom while providing sufficient gripping force to harvest the mushroom from the bed. The control circuit may measure the level of vacuum being supplied to the suction gripper (i.e. the pressure) and make changes to the level of vacuum based on the measurement and on harvesting parameters (e.g. mushroom cap diameter, size of suction cup). Preferably, the air pressure is actively adjusted during harvesting of a mushroom to be lower than atmospheric pressure by an amount in a range of about 75-255 mmHg.

Where a venturi vacuum generator is used, an output signal from the control circuit board may be sent to a programmable pressure regulator to adjust the compressed air supplied to the vacuum generator. When a vacuum pump is used, an output signal from the control circuit board may control a variable orifice in a vacuum supply line or adjust the speed of the vacuum pump motor. In other cases, the control circuit may control a valve assembly (e.g. a butterfly valve) in the suction gripper and the valve assembly is adjusted depending on the measured pressure to maintain a vacuum set point. In this way, the level of suction being applied to the mushroom cap can be adjusted in real time as required throughout the harvesting process.

The control circuit (for example on a circuit board) may be mounted at any suitable location in the device or system, for example in a control apparatus for the system (e.g. a computer), in the robotic arm (e.g. in the suction gripper itself or an adapter for mounting the suction gripper) and/or in the vacuum generating apparatus. The control circuit may be configured for electronic communication with a control apparatus, the control apparatus configured to operate the mushroom harvesting system including the device.

It is of particular note that the strength of the vacuum used in the present invention may be considerably less than the strength of the vacuums used in other suction-based systems. By including a plurality of suction grippers specifically designed to accommodate mushrooms of different size and shape profiles, it is possible to reduce the strength of the vacuum while maintaining the same or better gripping ability. Further, active control of the vacuum pressure based on the particular suction gripper being used at any one time permits maintaining reduced vacuum strength no matter what size mushroom is being harvested. In addition, active pressure control permits changing the pressure at other stages of the harvesting process, for example the trimming stage or the packaging stage, thereby ensuring that the proper gripping ability is maintained throughout the harvesting process. The combination of a plurality of different suction grippers and active pressure control leads to improved control over the harvesting process while reducing damage to the mushrooms during handling.

The device for harvesting mushrooms may be part of a system for harvesting mushrooms. The system comprises other components including, for example, one or more cameras for locating mushrooms in the bed and a control apparatus operatively linked to the one or more cameras and the mushroom harvesting device. The control apparatus may be configured to operate the mushroom harvesting device to harvest mushrooms located by the one or more cameras from the bed. One or more sensors (e.g. laser sensors) located on the robotic arm and in electronic communication with the control apparatus may be used to assist in locating mushrooms in the bed, particularly for determining height of target mushrooms in the bed.

The system may further comprise a user interface for the control apparatus, an electrical supply, a mushroom bed, one or more trimming stations, one or more stations for root and/or stem disposal and a cleaning apparatus for cleaning the suction grippers. The cleaning apparatus may be configured to automatically clean the plurality of suction grippers. The control apparatus may include a routine to clean a suction gripper after a preset number of harvest cycles have been exceeded. The cleaning apparatus may comprise, for example, a brush, a cloth, a pressurized air jet or a pressurized water jet. One embodiment of a mushroom harvesting system in which a device of the present invention is useful is described in commonly owned co-pending U.S. Provisional Patent Application Ser. No. 61/985,266 filed Apr. 28, 2014, the entire contents of which is herein incorporated by reference.

Control software for controlling aspects of the system for harvesting mushrooms may be embodied in the control apparatus. Electronic communication may be provided through wires or wirelessly. The control apparatus may comprise, for example, a computer, an output device and an input device, the computer comprising a microprocessor for controlling operations and a non-transient electronic storage medium for storing information about the mushrooms and bed and/or for storing computer executable code for carrying out instructions for implementing the method. The computer may further comprise a transient memory (e.g. random access memory (RAM)) accessible to the microprocessor while executing the code. The computer may be conveniently mounted in an electrical panel for the system. A plurality of computer-based apparatuses may be connected to one another over a computer network system and geographically distributed. One or more of the computer-based apparatuses in the computer network system may comprise a microprocessor for controlling operations and a non-transient electronic storage medium for storing information about the mushrooms and bed and/or for storing computer executable code for carrying out instructions for implementing the method, and the computer-based apparatuses in the network may interact so that the harvesting operation may be carried out automatically from remote locations. The output device may be a monitor, a printer, a device that interfaces with a remote output device or the like. The input device may be a keyboard, a mouse, a microphone, a device that interfaces with a remote input device or the like. With a computer, data (e.g. images from cameras) may be a graphically displayed in the output device.

The control software may be configured to manage a variety of functions in the system. The control software may comprise, for example: vision application software configured to process digital image data received from the one or more cameras into mushroom location and size information; harvest control software that dictates priority of mushrooms to be harvested; robot movement direction software to provide a sequence of movements that the robotic arm makes for each harvest cycle; operator interface software to run the user interface; and software for other functions such as turning trim stations on and off, counting mushrooms going into each package tray, etc.

A subsidiary controller for the robotic arm may be configured to receive a sequence of commands provided by the control apparatus, for example "move to location XYZ", and interprets these commands into actual robot commands. For example, a move command such as "move to location XYZ" requires the robotic arm to coordinate the motion of up to 6 individual servo motors into a smooth combined movement for the entire robotic arm. The subsidiary controller for the robotic arm may be located in any convenient location, for example in the same location as the control apparatus, and the robotic arm may be in electronic communication with the subsidiary controller through wires/cables and/or wirelessly.

The control circuit is also a subsidiary controller and is configured to control the negative air pressure in the suction grippers. The control circuit may measure the vacuum level being supplied to the suction gripper. A micro-processor of the control circuit may compare the vacuum level measurement to pre-set levels and communicate directly with the vacuum source to adjust the pressure. For example, the control circuit may communicate directly with a valve (e.g. a digital solenoid valve) to adjust the compressed air being supplied to a venturi vacuum generator. Vacuum set points for different stages of the harvest process may be inputted on the user interface. The control apparatus may electronically pass these set points to the control circuit, e.g. via serial communication.

In operation, cap diameter and centroid location of a mushroom on the mushroom bed is provided to the robotic arm by the one or more cameras. In the case of a single camera, the centroid location is provided in 2-dimensional X-Y coordinates only. The height of each target mushroom may be determined by another camera or by a sensor mounted on an end-of-arm tooling of the robotic arm. The robotic arm may position the sensor over the centroid X-Y location received from the single camera such that the sensor can measure the mushroom cap height. The robotic arm now has the 3-dimensional coordinates for harvesting the target mushroom. In order to maximize productivity, harvesting all mushrooms within a common size category before changing suction grippers is recommended.

The mushroom cap diameter is employed by the control apparatus to ensure that the correct suction gripper is mounted in the end-of-arm tooling of the robotic arm for the target mushroom to be harvested. As described above, the different suction grippers are interchangeable. In one embodiment, the different suction grippers are mounted in a rack within the work envelope of the robotic arm. The robotic arm may be programmed to automatically to swap between suction grippers based on the cap diameter of the mushrooms to be harvested. In another embodiment, all suction grippers may be mounted on a carousel installed on the end-of-arm tooling. Changing from one suction gripper to another would involve rotating the carousel to the correct position.

After gripping the target mushroom, the robotic arm moves through a specific rotation, shifting and pulling motion to remove the mushroom from the bed. The suction gripper retains the mushroom through transport, stem trim and unload processes. At an unload position, the vacuum source is switched off. In order to help ensure the mushroom in the suction gripper is transferred to a package tray, a puff of compressed air from a separate air compressor may be introduced into to the suction gripper.

With reference to FIG. 1, an embodiment of a mushroom harvesting device 3 of the present invention is depicted in context of a mushroom harvesting work cell 1. The cell 1 comprises a frame 5 on which components of a mushroom harvesting system 2 are mounted. The system 2 comprises: a mushroom tray 10 in which mushrooms 12 are growing in a growth mixture; a user interface 14, in this case a touch screen, in electronic communication with a controller 20, in this case a computer mounted in an electrical panel 21 of the system 2 on the frame 5; a robotic arm 16 in electronic communication with the controller 20 and configured to pick mushrooms 12 from the mushroom tray 10; a vacuum pump 22 in fluid communication with the robotic arm 16 for supplying negative air pressure to the robotic arm 16 and in electronic communication with the robotic arm 16 for controlling negative air pressure based on mushroom picking parameters and the state of the robotic arm 16; a camera assembly 18 including a digital camera 17 and lights 19 to provide stable illumination of the tray 10, in electronic communication with the controller 20 and configured to take images of the mushroom tray 10; and first and second trim stations 25, 27 configured to receive picked mushrooms from the robotic arm 16 and then trim the stems of the picked mushrooms.

In operation, the harvesting cycle first begins with the mushroom tray 10 being loaded onto a table 7 supported at a front of the frame 5 where a digital image of the mushroom tray 10 is captured by the digital camera 18. With pre-determined picking settings, the controller 20 will find all mushrooms 12 in the mushroom tray 10 and will determine which mushrooms 12 will be picked. While the controller 20 is finding and calculating which mushrooms 12 should be picked, the tray 10 is moved to a picking position under the robotic arm 16, and when the calculations are complete the robotic arm 16 commences picking of the selected mushrooms aided by vacuum supplied by the vacuum pump 22 to a suction gripper 30 mounted on the robotic arm 16. Control of negative air pressure in the suction gripper 30 is accomplished by controlling the vacuum pump 22 based on air pressure measurements in the suction gripper 30. A control circuit for controlling air pressure may be located in the controller 20, in the robotic arm 16 (e.g. in the suction gripper 30) and/or in the vacuum pump 22. The robotic arm 16 transfers a mushroom to the first trim station 25 where the stem of the mushroom is trimmed right above the root structure of the mushroom. The mushroom root structure is collected into a bin through first chute 26 for disposal. The mushroom without the root structure is then transferred by the robotic arm 16 to the second trim station 27 where the mushroom stem is cut at a specified length relative to the diameter of the mushroom cap. The stem section is collected into a separate bin through second chute 28, and can be sold by the mushroom grower to food processors who will use the stems as an ingredient in, for example, soups and sauces. The trimmed mushroom may then be transferred by the robotic arm 16 to a mushroom packaging system (not shown). The suction gripper 30 may be cleaned with a brush 29 located within the work envelope of the robotic arm 16 by using the robotic arm 16 to pass the suction gripper 30 through bristles of the brush.

Figure 2A:
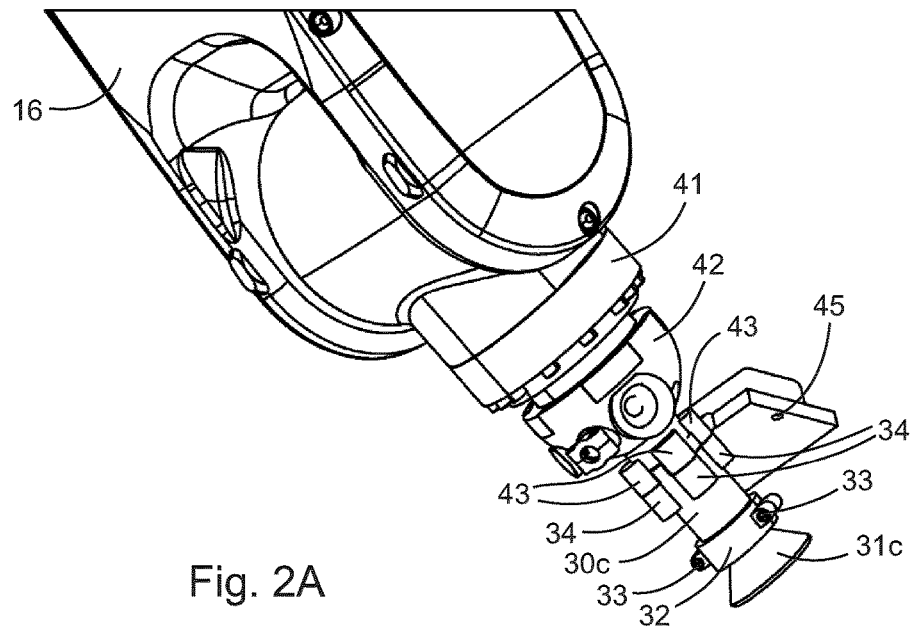
FIG. 2A depicts a magnified view of an end-of-arm tooling of a robotic arm having one interchangeable suction gripper mounted thereon.
Figure 2B:
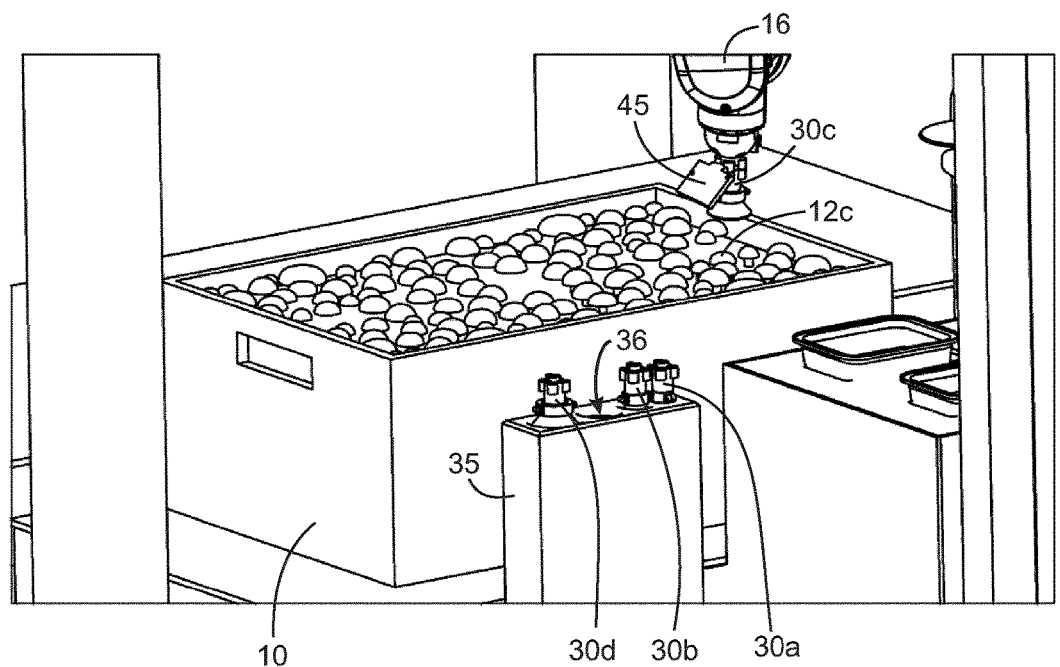
FIG. 2B depicts the robotic arm of FIG. 2A with three other suction grippers stored in a rack within a work envelope of the robotic arm.

In FIG. 1, the device 3 for harvesting mushrooms is part of the mushroom harvesting system 2, the device comprising the robotic arm 16, the vacuum pump 22 and the control circuit for controlling the negative air pressure in the robotic arm 16. FIG. 2A and FIG. 2B illustrate one embodiment of the harvesting device in which the robotic arm 16 has one interchangeable suction gripper 30c mounted on an end-of-arm tooling 41 of the robotic arm 16. The suction gripper 30c comprises a suction cup 31c mounted on the suction gripper 30c via a clamping collar 32, two halves of clamping collar 32 being secured together with two bolts 33 to clamp the suction cup 31c to the suction gripper 30c. The end-of-arm tooling 41 comprises an adaptor 42 mounted thereon, the adaptor 42 comprising four adaptor magnets 43 that mate with four gripper magnets 34 (see FIG. 4A for more detail) to magnetically secure the suction gripper 30c to the adaptor 42 and thus to the robotic arm 16 at the end-of-arm tooling 41 of the robotic arm 16. The robotic arm 16 is programmed to orient the suction gripper 30c over a mushroom 12c in the mushroom tray 10, the mushroom 12c having an appropriate size and shape profile for the suction cup 31c based on image and position information collected by the system's camera (see FIG. 1) and a laser sensor 45, the laser sensor 45 being mounted on the adaptor 42 at the end-of-arm tooling 41 of the robotic arm 16. The robotic arm 16 preferably has 6-axes of motion. All manipulations of the end-of-arm-tooling 41, including orienting the suction gripper 30c and applying a twisting force to a mushroom held by the suction cup 31c when harvesting the mushroom from the mushroom tray 10, are conducted by the robotic arm 16. A control circuit including a pressure sensor for controlling the negative air pressure in the suction gripper is installed in a cavity inside the adaptor 42.

Once the robotic arm 16 with the suction gripper 30c harvests all mushrooms 12c of the appropriate size and shape profile for the suction cup 31c, the robotic arm 16 is programmed to change suction grippers in order to harvest mushrooms of a different size and shape profile. With specific reference to FIG. 2B, the robotic arm 16 may move the suction gripper 30c to a rack 35 configured to store four different suction grippers 30a, 30b, 30c, 30d within the work envelope of the robotic arm 16. At the rack 35, the robotic arm 16 may release the suction gripper 30c. Where the adaptor magnets 43 (or the gripper magnets 34, or both) are electromagnets, temporarily reversing polarity in the adaptor magnets 43 (or gripper magnets 34) releases the suction gripper 30c to occupy position 36 in the rack 35. Then the robotic arm 16 may pick up one of the other suction grippers 30a, 30b, 30d by positioning the end-of-arm tooling 41 over the desired suction gripper and changing back the polarity in the magnets. Where the adaptor magnets 43 and the gripper magnets 34 are permanent magnets, the rack 35 may be configured to receive and retain the suction gripper 30c in such a manner (e.g. with a slotted plate) that once the suction gripper 30c is received and retained in the rack 35, an upward movement of the robotic arm 16 with sufficient force would break the magnetic attraction and the robotic arm 16 would then be free to pick up one of the other suction grippers 30a, 30b, 30d.

All of the suction grippers 30a, 30b, 30c, 30d are of the same design except for the size of the gripper and suction cups. FIG. 3A, FIG. 3B, FIG. 3C and FIG. 3D depict same scale side views of a suction grippers 30a, 30b, 30c and 30d comprising suction cups 31a, 31b, 31c, and 31d, respectively, harvesting mushrooms 12a, 12b, 12c, and 12d, respectively. The mushroom 12a has a major cap diameter in a range of about 20-30 mm, the mushroom 12b has a major cap diameter in a range of about 30-40 mm, the mushroom 12c has a major cap diameter in a range of about 40-50 mm, and the mushroom 12d has a major cap diameter in a range of about 50-60 mm.

Figure 3A:
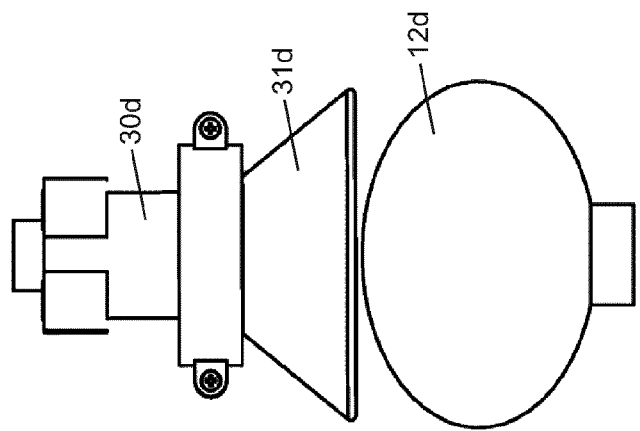
FIG. 3A depicts a side view of a suction gripper suitable for harvesting mushrooms with a major cap diameter of 20-30 mm.
Figure 3B:
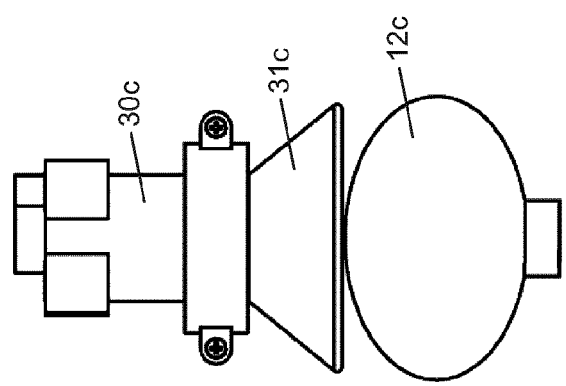
FIG. 3B depicts a side view of a suction gripper suitable for harvesting mushrooms with a major cap diameter of 30-40 mm.
Figure 3C:
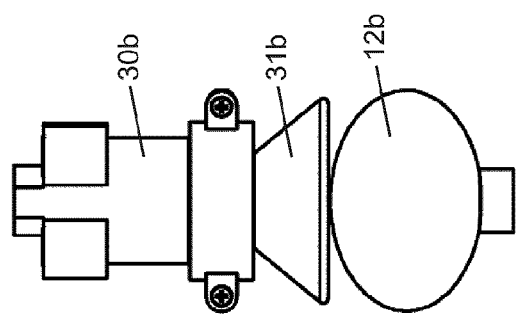
FIG. 3C depicts a side view of a suction gripper suitable for harvesting mushrooms with a major cap diameter of 40-50 mm.
Figure 3D:
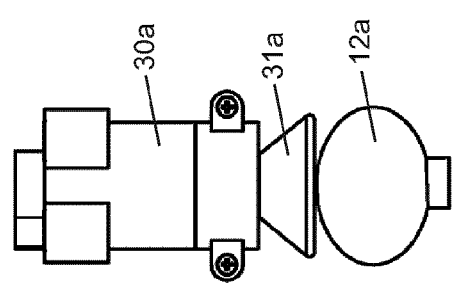
FIG. 3D depicts a side view of a suction gripper suitable for harvesting mushrooms with a major cap diameter of 50-60 mm.

More details of the suction grippers with specific reference to the suction gripper 30a are shown in FIG. 4A, FIG. 4B, FIG. 4C and FIG. 4D. The suction gripper 30a comprises a gripper body 37 and suction cup 31a mounted at a distal end on the gripper body 37 via a clamping collar 32, two halves of the clamping collar 32 being secured together with two bolts 33. The suction gripper 30a further comprises four gripper magnets 34 disposed around a proximal end of the gripper body 37, the four magnets 34 configured to interact with four magnets of the adaptor on the end-of-arm tooling of the robotic arm in order to secure the suction gripper 30a to the robotic arm. Fewer or greater than four magnets may be used provided there is sufficient magnetic strength to hold the suction gripper 30a to the robotic arm throughout harvesting operations. The suction gripper 30a further comprises a locator key 49, which is configured to be mated with a locator slot in the adaptor. The locator key 49 and locator slot help properly align the suction gripper 30a with the adaptor and prevents the suction gripper 30a from twisting during harvesting operations. Preventing twisting helps prevent separation of the gripper magnets 34 from the adaptor magnets thereby ensuring securement of the suction gripper 30a to the robotic arm. The adaptor magnets may be electromagnets so that the polarity of the electromagnets may be reversed to release the suction gripper from the adaptor. The adaptor magnets may be permanent magnets, in which case a force from the robotic arm or an outside agency may be required to separate the suction gripper from the adaptor. The suction gripper 30a further comprises a vacuum port 52 in fluid communication with the vacuum pump of the system for providing negative air pressure to the suction cup 31a. The vacuum port 52 extends longitudinally through the suction gripper 30a along longitudinal axis Z and is about 6.35 mm in diameter at the proximal end of the gripper body 37. The suction gripper 30a has a length L, which is about 47.4 mm long from the proximal end of the gripper body 37 to a base 39 of the suction cup 31a. The length L of the suction cups 31b, 31c, and 31d of the larger-sized suction grippers shown in FIG. 3B, FIG. 3C and FIG. 3D are about 47.80 mm, 51.75 mm and 54.10 mm, respectively.

With specific reference to FIG. 4C and FIG. 4D, the suction cup 31a is right frustoconical and the base 39 has a diameter D of about 22.56 mm. The diameter D of the suction cups 31b, 31c, and 31d of the larger-sized suction grippers shown in FIG. 3B, FIG. 3C and FIG. 3D are about 32.56 mm, 42.56 mm and 52.48 mm, respectively. Inner wall 38 of the suction cup 31a forms an angle of 45° with a longitudinal axis Z passing through the center of the base 39 and a notional apex of the cone. The suction cup 31a comprises a rubber-like material having a 26 durometer and is about 1.5 mm thick at the base 39, the thickness tapering larger away from the base 39 at an angle of about 5.7°. An aperture 53 at the apex of the frustoconical suction cup 31a is about 5 mm in diameter and is aligned with the vacuum port 52.

FIG. 5A and FIG. 5B depict an alternate embodiment showing four suction grippers 30a, 30b, 30c and 30d mounted on a rotatable carousel 60, the carousel 60 rotatably mounted on a carousel adaptor 65, which in turn is mounted on the end-of-arm tooling 41 of the robotic arm 16. The carousel 60 comprises four gripper mounts 61a, 61b, 61c and 61d extending perpendicularly from an axis of rotation of the carousel 60, the carousel 60 rotatable about pivot point 62. Rotation of the carousel 60 through successive 90° angles sequentially configures each of the suction grippers 30a, 30b, 30c and 30d in a vertical and downwardly oriented configuration so that each of the suction grippers 30a, 30b, 30c and 30d may be used to harvest mushrooms from the mushroom tray. All other manipulations of the end-of-arm-tooling 41 are conducted by the robotic arm 16, which preferably has 6 axes of motion for properly orienting and manipulating the suction grippers 30a, 30b, 30c and 30d. In this way, proper orientation of the suction grippers 30a, 30b, 30c and 30d may be accomplished in the three spatial dimensions.

The suction grippers 30a, 30b, 30c and 30d are the same as described in connection with FIGS. 3A-3D and FIGS. 4A-4D. The gripper mounts 61a, 61b, 61c and 61d are designed with magnets in a fashion similar to the adaptor described in connection with FIG. 2A. The gripper mounts function to hold the suction grippers in a similar manner as described above in connection with FIG. 2A. The carousel 60 provides the added advantage that the suction grippers 30a, 30b, 30c and 30d may be mounted once without the need to dismount and re-mount suction grippers when a different size category of mushrooms is to be harvested.

REFERENCES

The contents of the entirety of each of which are incorporated by this reference.

Janssen J J J, van Nunen J J H, Giebels M M J L. (1995) Device for the Automatic Selective Harvesting of Mushroom. U.S. Pat. No. 5,471,827 issued Dec. 5, 1995.

Rapila T, Kantola J, Rapila T. (2011) U.S. Pat. No. 8,033,087 issued Oct. 11, 2011.

Russell T A, Wheeler G C. (1993) Mushroom Harvesting. U.S. Pat. No. 5,185,989 issued Feb. 16, 1993.

Smits A T M T. (1987) Mechanism to pick cultivated mushrooms. Abstract of Netherlands Patent Publication NL 8600887 published Nov. 2, 1987.

Steijvers A, Steijvers J. (1991) Equipment for Selective Harvesting of Mushrooms and Other Related Crops. International Patent Publication WO 91/11902 published Aug. 22, 1991.

Van Den Top H. (2009) Device and Method for Harvesting Crop and Cropholder. United States Patent Publication US 2009/0188771 published Jul. 30, 2008.

Wheeler G C. (1991) Harvesting of Delicate Produce. U.S. Pat. No. 5,058,368 issued Oct. 22, 1991.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A device for harvesting mushrooms from a mushroom bed, comprising:
    a robotic arm configured to interchangeably deploy one of a plurality of different suction grippers, each of the suction grippers comprising a suction cup having a size and shape profile appropriate for gripping a cap of a mushroom, the cap having a size and shape profile within a predetermined range, the robotic arm configured to position the suction gripper over a mushroom to be harvested;
    a vacuum source in fluid communication with the suction gripper for supplying negative air pressure to the suction gripper for retaining a cap of the mushroom to be harvested in the suction cup; and,
    a control circuit in electronic communication with the suction gripper and the vacuum source, the control circuit configured to automatically adjust the negative air pressure in the suction gripper in response to harvesting requirements during a mushroom harvesting process.

2. The device according to claim 1, wherein the plurality of different suction grippers comprises 3-5 suction grippers.

3. The device according to claim 1, wherein the plurality of different suction grippers comprises 4 suction grippers.

4. The device according to claim 1, wherein the plurality of suction grippers are releasably mountable on the robotic arm, the robotic arm is configured to hold one suction gripper at a time, and the robotic arm is configured to automatically release one of the plurality of suction grippers and mount another of the plurality of suction grippers in response to harvesting requirements during a mushroom harvesting process.

5. The device according to claim 4, wherein the suction grippers are magnetically mountable on the robotic arm.

6. The device according to claim 1, wherein the plurality of suction grippers are mounted on a rotatable carousel, and the carousel is rotatably mounted on the robotic arm.

7. The device according to claim 6, wherein the suction grippers are releasably mounted on the carousel.

8. The device according to claim 6, wherein the suction grippers are magnetically mountable on the carousel.

9. The device according to claim 1, wherein the suction cup of one of the suction grippers has a right circular frustoconical inner wall with a base diameter in a range of 21-24 mm, 31-34 mm, 41-44 mm or 51-54 mm.

10. The device according to claim 1, wherein the plurality of different suction grippers comprises first, second, third and fourth suction grippers, the suction cups of the first, second, third and fourth suction grippers have right circular frustoconical inner walls, the suction cup of the first suction gripper has a base diameter in a range of 21-24 mm, the suction cup of the second suction gripper has a base diameter in a range of 31-34 mm, the suction cup of the third suction gripper has a base diameter in a range of 41-44 mm, and the suction cup of the fourth suction gripper has a base diameter in a range of 51-54 mm.

11. The device according to claim 1, wherein the plurality of different suction grippers comprises first, second, third and fourth suction grippers, the suction cups of the first, second, third and fourth suction grippers have right circular frustoconical inner walls, the suction cup of the first suction gripper has a base diameter in a range of 22-23 mm, the suction cup of the second suction gripper has a base diameter in a range of 32-33 mm, the suction cup of the third suction gripper has a base diameter in a range of 42-43 mm, and the suction cup of the fourth suction gripper has a base diameter in a range of 52-53 mm.

12. The device according to claim 1, wherein the control circuit is mounted in an adaptor, the adaptor mounted on the robotic arm, the adaptor configured to mount the plurality of different suction grippers on the robotic arm.

13. The device according to claim 1, wherein the control circuit is configured for electronic communication with a control apparatus, the control apparatus configured to operate a mushroom harvesting system including the device.

14. The device according to claim 1, wherein the air pressure in the suction gripper is actively controllable to reduce damage to the mushroom cap during harvesting.

15. The device according to claim 1, wherein the vacuum source comprises a venturi vacuum generator.

16. A system for harvesting mushrooms from a mushroom bed, comprising: a mushroom harvesting device as defined in claim 1 configured to harvest mushrooms from the bed; one or more cameras for locating mushrooms in the bed; and, a control apparatus operatively linked to the one or more cameras and the mushroom harvesting device, the control apparatus configured to operate the mushroom harvesting device to harvest mushrooms located by the one or more cameras from the bed.

17. The system according to claim 16, further comprising a cleaning apparatus for automatically cleaning the plurality of suction grippers of the mushroom harvesting device.

18. A method of harvesting mushrooms from a mushroom bed, comprising: disposing a device as defined in claim 1 over a mushroom in the bed; determining which of the plurality of different suction grippers to use to harvest the mushroom; deploying the determined suction gripper over the mushroom; and, supplying negative air pressure to the suction gripper to retain a cap of the mushroom in the suction cup of the determined suction gripper.

19. The method according to claim 18, wherein the negative air pressure is actively adjusted during harvesting of the mushroom to reduce damage to the cap of the mushroom while providing sufficient gripping force to harvest the mushroom from the bed.

20. The method according to claim 18, wherein the negative air pressure is lower than atmospheric pressure by an amount in a range of 75-255 mmHg.

* * * * *